O. A. WEISSENBORN.
MEANS FOR IDENTIFYING MOTOR OR OTHER VEHICLES IN CASE OF ACCIDENT.
APPLICATION FILED AUG. 22, 1911.

1,036,942.

Patented Aug. 27, 1912.

2 SHEETS—SHEET 1.

Witnesses:

Inventor:
Oscar A. Weissenborn
By his Attorney,
David W. Gardner.

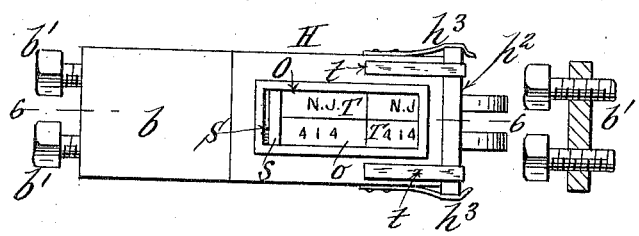
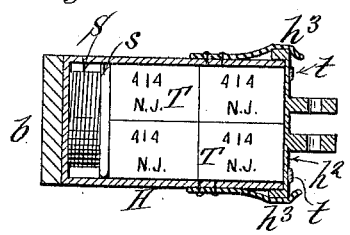
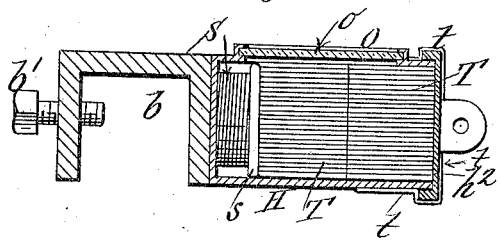
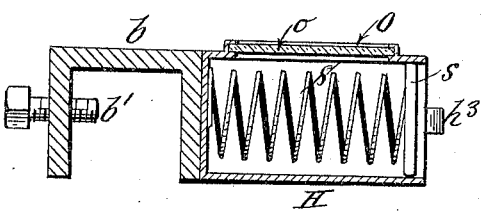
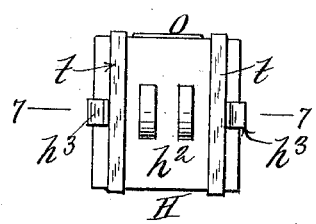

UNITED STATES PATENT OFFICE.

OSCAR A. WEISSENBORN, OF JERSEY CITY, NEW JERSEY.

MEANS FOR IDENTIFYING MOTOR OR OTHER VEHICLES IN CASE OF ACCIDENT.

1,036,942.  Specification of Letters Patent.  Patented Aug. 27, 1912.

Application filed August 22, 1911. Serial No. 645,369.

*To all whom it may concern:*

Be it known that I, OSCAR A. WEISSENBORN, a citizen of the United States, residing in Jersey City, Hudson county, and State of New Jersey, have invented certain new and useful Improvements in Means for Identifying Motor or other Vehicles in Case of Accident, of which the following is a specification.

My invention relates to means whereby a motor or other vehicle may be readily identified in case of "running down," injuring or even killing a person, and then escaping before the parties responsible for such deed can be apprehended, and the invention consists broadly in mounting a receptacle or holder provided with identification cards, tickets, &c., upon a motor or other vehicle, and in means for positively releasing said tickets, cards, &c., whereby the same may be scattered over the road-way, and picked up after the vehicle has passed by.

In the accompanying drawings, I show and describe practical means for carrying out my invention, but it is to be distinctly understood that I do not confine myself to the identical construction therein shown, since various mechanical expedients may be resorted to without departing from the spirit and intent of my invention.

Figure 1:
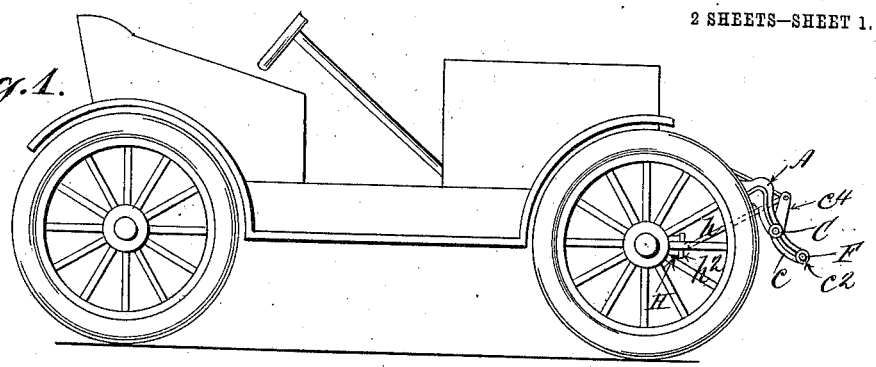
Figure 2:
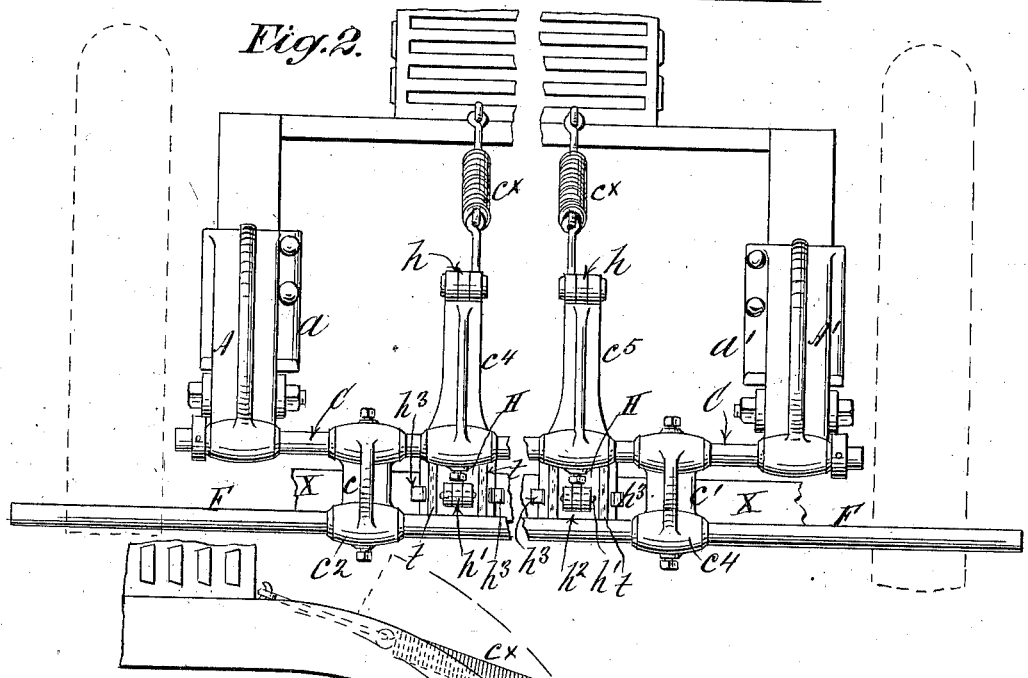
Figure 3:
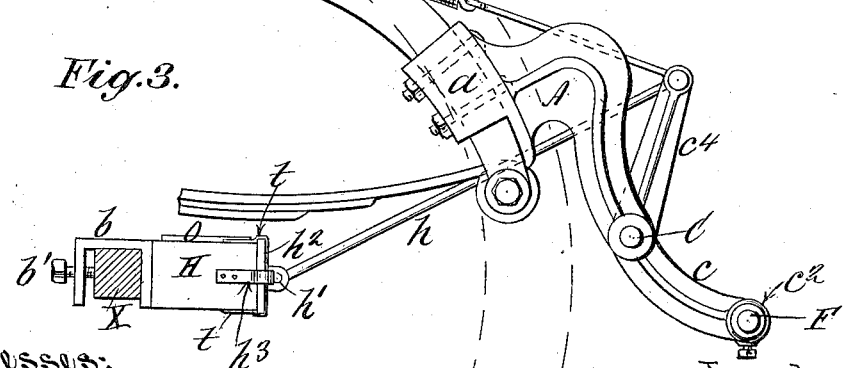

Figure 1, is a side elevation of a motor vehicle equipped with my invention; Fig. 2, is a front elevation upon an enlarged scale, of means for carrying out my invention; Fig. 3, a side elevation of the same, parts being broken away to show more clearly the means of attachment to the motor vehicle; Fig. 4, a plan upon an enlarged scale of the ticket receptacle or holder, removed; Fig. 5, a vertical sectional elevation upon plane of line 6—6 Fig. 4; Fig. 6, a longitudinal sectional elevation upon plane of line 7—7, Fig. 8; Fig. 7, a view similar to Fig. 5, showing the receptacle empty and without the cover; Fig. 8, a front elevation of the receptacle.

Mounted loosely in brackets A, A', secured rigidly to a stationary part of the motor vehicle (as by clamps $a$, $a'$) is a cross bar or rod C, to which is rigidly secured the arms $c$, $c'$, having bearings $c^2$, $c^3$, at their outer ends in which is held the fender F. This fender F, may be made of any light material such as light metal tubing, bamboo, or wood, and preferably extends the whole width of the motor vehicle.

Rigidly secured to the cross bar C, is one or more rock lever arms $c^4$, $c^5$, connected by a rod or rods $h$, to the movable part or parts $h^2$, of the receptacle H, for holding the identification cards, tickets &c. This receptacle H, is secured to a stationary part of the motor vehicle. As shown in the drawings it is mounted on the front axle X, by means of a clamp bracket or brackets $b$, and set screws $b'$. The connecting rod $h$, is fulcrumed at $h'$, to a removable cover $h^2$, on the front end of the receptacle H, held in place thereon by springs $h^3$, which under normal conditions hold said cover $h^2$, in place. This receptacle H, may be preferably provided with an expansion spring S, secured at its inner end to the receptacle H, and having at its outer end an ejecting disk $s$, for the purpose hereinafter set forth. The receptacle may also be provided with an opening O, in which is secured a transparent medium $o$, for purposes of observing the tickets T contained therein.

Seals or sealing strips $t$, of any suitable material may be provided for insuring against the removal surreptitiously of the tickets T, when once placed within the receptacle.

The operation of my device is as follows. The receptacle H having been filled with the necessary identification cards T, and the same having been sealed as at $t$, by the proper authorities, supposing the parts to be in their normal positions. The fender F on meeting with an obstruction will rock the arm or arms $c^4$, $c^5$, forward against the tension of the springs $c^x$, $c^x$, thereby pulling the cover $h^2$, through the medium of the connecting rod $h$, off of the receptacle H, and allowing the tickets to be ejected from said receptacle under the influence of the spring S and disk $s$. It being understood of course that the seals $t$, will be broken and destroyed during this operation.

The tickets, cards, &c., may be placed under State, county or city supervision, and upon a person applying for a license for a motor vehicle, the said authorities may issue the same.

The holder to all intents and purposes is hermetically sealed, and the contents thereof effectually protected against any climatic changes.

It is to be understood that while I have herein shown a plurality of card receptacles and levers for operating the same, it may be desirable in some cases to use only one receptacle with the same result.

The cards, tickets, &c., may be made of suitable material such as card board, thin sheets of paper or even of metal if desired, and may have any desired matter printed or stamped thereon. The seals likewise may have on their surfaces some distinguishing mark, so that they cannot easily be duplicated unless by the proper authorities.

What I claim as my invention and desire to secure by Letters Patent is,

1. A device for divulging the identity of a motor vehicle in case of accident, comprising a rock bar, stationary brackets in which said rock bar is mounted, arms fixed at one end to said rock bar, said brackets mounted on the frame-work of the vehicle, a yieldable fender mounted upon and between the free ends of said arms, a receptacle adapted to hold a plurality of identification cards, means for ejecting a plurality of cards from said receptacle when the cover of the receptacle is withdrawn, a third arm mounted on said rock bar, and a connection between said cover and said last named arm, whereby the rocking of the bar will remove the cover and release a plurality of identification cards for the purpose described.

2. A device for divulging the identity of a motor vehicle in case of accident, comprising a rock bar, stationary brackets in which said rock bar is mounted, arms fixed at one end to said rock bar, said brackets mounted on the frame-work of the vehicle, said rock bar and said stationary brackets, a yieldable fender mounted upon and between the free ends of said arms, a receptacle adapted to hold a plurality of identification cards, means for positively ejecting a plurality of identification cards from said receptacle when the cover of the receptacle is withdrawn, a third arm mounted on said rock bar, and a connection between said cover and said last named arm whereby the rocking of the bar will positively withdraw the cover entirely from the front of the receptacle and release a plurality of identification cards, for the purpose described.

OSCAR A. WEISSENBORN.

Witnesses:
RUDOLPH C. E. MAY,
D. W. GARDNER.